United States Patent
Ohkawa et al.

(10) Patent No.: US 7,351,760 B2
(45) Date of Patent: Apr. 1, 2008

(54) THERMOPLASTIC RESIN COMPOSITION AND ITS INJECTION MOLDED ARTICLE

(75) Inventors: Kenichi Ohkawa, Ichihara (JP); Moriyasu Shimojo, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 172 days.

(21) Appl. No.: 10/694,724

(22) Filed: Oct. 29, 2003

(65) Prior Publication Data

US 2004/0132889 A1 Jul. 8, 2004

(30) Foreign Application Priority Data

Oct. 30, 2002 (JP) ............................ 2002-315515

(51) Int. Cl.
*C08K 3/30* (2006.01)

(52) U.S. Cl. ...................... 524/423; 524/451; 524/525; 524/528

(58) Field of Classification Search ................ 524/423, 524/451, 525, 528
See application file for complete search history.

(56) References Cited

U.S. PATENT DOCUMENTS

| | | | | |
|---|---|---|---|---|
| 5,667,872 | A | * | 9/1997 | Ohno et al. ................. 428/141 |
| 6,384,122 | B1 | * | 5/2002 | Hirakawa et al. ........... 524/451 |
| 2002/0004546 | A1 | * | 1/2002 | Ohkawa et al. ............. 524/423 |
| 2004/0053064 | A1 | * | 3/2004 | Masuda et al. ............. 428/500 |

FOREIGN PATENT DOCUMENTS

| | | |
|---|---|---|
| JP | 7-286022 A | 10/1995 |
| JP | 7-286075 A | 10/1995 |
| JP | 2002-12718 A | 1/2002 |

* cited by examiner

*Primary Examiner*—Bernard Lipman
(74) *Attorney, Agent, or Firm*—Sughrue Mion, PLLC

(57) ABSTRACT

The present invention provides a thermoplastic resin composition including specific amounts of (A) a polypropylene resin, (B) an elastomer, (C) inorganic filler, (D) a resin having a melt tension of 0.1 N or more and a swelling ratio of 1.8 or more and being characterized by that the time required for the resin until the ratio (G(t)/G(0.02)) of a relaxation modulus G(t) measured at 210° C. to a relaxation modulus G(0.02) at a time of 0.02 sec reaches 0.01 is 10 sec or more, and (E) a resin characterized by that, with respect to a swelling ratio measured at 220° C. at an L/D of an orifice of 40, the ratio of a swelling ratio ($SR10^3$) at a shear rate of $2.4 \times 10^3$ $sec^{-1}$ to a swelling ratio ($SR10^2$) at a shear rate of $1.2 \times 10^2$ $sec^{-1}$, $SR10^3/SR10^2$, is from 1.0 to 1.1.

8 Claims, No Drawings

THERMOPLASTIC RESIN COMPOSITION AND ITS INJECTION MOLDED ARTICLE

BACKGROUND OF THE INVENTION

1. Field of the Invention

The present invention relates to a thermoplastic resin composition which is excellent in rigidity, impact resistance and fluidity and from which molded articles having excellent appearance, particularly having favorable flow marks, can be obtained. In addition, the present invention relates to an injection-molded article comprising the thermoplastic resin composition.

2. Description of the Related Art

Polypropylene-based resins have been used widely in materials which are required to have, for example, high rigidity and high impact strength. Polypropylene-based resins have recently been used widely especially as materials for automobiles. In particular, ethylene-propylene block copolymers are used increasingly. Although ethylene-propylene block copolymers have conventionally been produced by a solvent method, such copolymers have recently been produced by a continuous gas phase method which comprises a simple production process and by which those copolymers can be produced at low cost.

However, an ethylene-propylene block copolymer produced by the gas phase method contains an ethylene-propylene copolymer portion having a low intrinsic viscosity $[\eta]_{EP}$. Therefore, the block copolymer generally has problems that it has a low swelling ratio (SR), that it forms unfavorable flow marks and that molded articles produced therefrom have poor appearance. Moreover, when an ethylene-propylene block copolymer is used which was produced by the gas phase method and which has a high intrinsic viscosity $[\eta]_{EP}$, pimples are formed therein and molded articles having poor appearance are obtained therefrom.

For solving the appearance problems mentioned above, JP-A-07-286022, for example, discloses a propylene-based block copolymer produced by a batchwise solvent method. The block copolymer contains a n-decane(23° C.)-insoluble component having an intrinsic viscosity of 0.1 to 20 dl/g and a n-decane(23° C.)-soluble component having an intrinsic viscosity of 5 to 15 dl/g. From the block copolymer, molded articles free of pimples can be formed. However, as disclosed in Comparative Example 3 in the foregoing document, an ethylene-propylene block copolymer containing a n-decane(23° C.)-soluble component of a high intrinsic viscosity, which component seems to be an ethylene-propylene block copolymer portion, contains many rubber granules which will cause pimples.

JP-A-07-286075 discloses a propylene polymer composition comprising a propylene polymer produced in a continuous mode and an ethylene-propylene block copolymer containing a n-decane(23° C.)-soluble component having an intrinsic viscosity of 5 to 12 dl/g. This document discloses that molded articles free of pimples can be formed from the composition. However, the content of the ethylene-propylene block copolymer compounded is as much as at least 12% by weight.

SUMMARY OF THE INVENTION

The object of the present invention is to provide a thermoplastic resin composition which is excellent in rigidity, impact resistance and fluidity and from which molded articles having excellent appearance, particularly having favorable flow marks, can be obtained, and to provide an injection-molded article comprising the thermoplastic resin composition.

Under such situations, the present inventors have intensively studied and resultantly found that the present invention described below can solve the above-mentioned problems.

The present invention relates to:

a thermoplastic resin composition comprising (A) 35 to 83.9% by weight of a polypropylene resin, (B) 10 to 35% by weight of an elastomer, (C) 2 to 30% by weight of inorganic filler, (D) 0.1% by weight or more but less than 5% by weight of a resin satisfying (Requirement 1) through (Requirement 3) defined below, and (E) 4 to 10% by weight of a resin satisfying (Requirement 4) defined below, provided that the amounts of (A), (B), (C), (D) and (E) indicated above are based on the total weight of these components.

(Requirement 1) The resin has a melt tension (MT), measured at 190° C. at a winding rate of 15.7 m/min, of 0.1 N or more.

(Requirement 2) The resin has a swelling ratio (SR), measured at 220° C. at an L/D ratio of an orifice of 40 and at a shear rate of $1.2\times10^3$ sec$^{-1}$, of 1.8 or more.

(Requirement 3) The time required for the resin until the ratio (G(t)/G(0.02)) of a relaxation modulus G(t) measured at 210° C. to a relaxation modulus G(0.02) at a time of 0.02 sec reaches 0.01 is 10 sec or more.

(Requirement 4) With respect to the swelling ratio measured at 220° C. at an L/D of an orifice of 40, the ratio of a swelling ratio (SR10$^3$) at a shear rate of $2.4\times10^3$ sec$^{-1}$ to a swelling ratio (SR10$^2$) at a shear rate of $1.2\times10^2$ sec$^{-1}$, SR10$^3$/SR10$^2$, is from 1.0 to 1.1.

The present invention also relates to an injection-molded article comprising the above-mentioned thermoplastic resin composition.

DETAILED DESCRIPTION OF PREFERRED EMBODIMENTS

The polypropylene-based resin (A) used in the present invention preferably is a crystalline polypropylene resin including therein repeating units derived from propylene in a content of more than 50 wt % and up to 100 wt %. Examples thereof include a crystalline propylene homopolymer, a crystalline ethylene-propylene copolymer, and a crystalline propylene-α-olefin copolymer. These may be used singly, or alternatively, two or more of them may be used in combination.

The α-olefin in the crystalline propylene-α-olefin copolymer includes α-olefins having at least four carbon atoms, preferably α-olefins having from 4 to 20 carbon atoms, and more preferably α-olefins having from 4 to 12 carbon atoms, examples of which include butene-1, pentene-1, hexene-1, heptene-1, octene-1 and decene-1. Examples of the crystalline propylene-α-olefin copolymer include a crystalline propylene-butene-1 copolymer, and a crystalline propylene-hexene-1 copolymer.

The crystalline polypropylene resin is preferably a crystalline propylene homopolymer, a crystalline ethylene-propylene block copolymer or a mixture thereof. Particularly preferred is a crystalline ethylene-propylene block copolymer or a mixture of a crystalline ethylene-propylene block copolymer and a crystalline propylene homopolymer.

The crystalline ethylene-propylene block copolymer used in the present invention is a crystalline ethylene-propylene block copolymer comprised of a propylene homopolymer portion (referred to as a "first segment") and an ethylene-propylene random copolymer portion (referred to as a "second segment").

The propylene homopolymer portion, the first segment, preferably has a Q value, which is a ratio of the weight average molecular weight to the number average molecular weight, namely Mw/Mn, determined by gel permeation chromatography (GPC), of from 3.0 to 5.0, more preferably from 3.5 to 4.5. The propylene homopolymer portion preferably has an isotactic pentad fraction calculated based on $^{13}$C-NMR of 0.98 or more, more preferably 0.99 or more. Further, the intrinsic viscosity $[\eta]_P$ of a 135° C. TETRALIN® (1,2,3,4-tetrahydronaphthalene) solution of the propylene homopolymer portion is preferably from 0.7 to 1.1 dl/g, more preferably from 0.8 to 1.0 dl/g.

The ethylene-propylene random copolymer portion, which is the second segment, preferably is one such that a 135° C. TETRALIN® (1,2,3,4-tetrahydronaphthalene) solution thereof has an intrinsic viscosity $[\eta]_{EP}$ of from 1.0 to 8.0 dl/g, preferably from 1.5 to 7.5 dl/g. Further, the second segment preferably has an ethylene content $[(C2')_{EP}]$ of from 25 to 35% by weight, more preferably from 27 to 33% by weight.

In addition, the weight ratio of the ethylene-propylene random copolymer portion (the second segment) to the propylene homopolymer portion (the first segment), namely the second segment-to-first segment ratio, is preferably 8/92 to 35/65.

The crystalline propylene homopolymer used as the polypropylene resin (A) in the present invention is a polymer having physical properties similar to those of the propylene homopolymer portion which is the first segment of the crystalline ethylene-propylene block copolymer. Preferred is that having a Q value, which is a ratio of the weight average molecular weight to the number average molecular weight, namely Mw/Mn, determined by gel permeation chromatography (GPC), of from 3.0 to 5.0, more preferably from 3.5 to 4.5. The crystalline propylene homopolymer preferably has an isotactic pentad fraction calculated based on $^{13}$C-NMR of 0.98 or more, more preferably 0.99 or more. Further, the intrinsic viscosity $[\eta]_P$ of a 135° C. TETRALIN® (1,2,3,4-tetrahydronaphthalene) solution of the crystalline homopolymer is preferably from 0.7 to 1.1 dl/g, more preferably from 0.8 to 1.0 dl/g.

The method for producing the polypropylene resin used in the present invention maybe a method in which the resin is produced using a known stereoregulating olefin polymerization catalyst and a known polymerization process. Examples of the known catalyst include Ziegler-Natta catalysts, metallocene catalysts and catalysts comprising combinations thereof. Examples of the known polymerization process include bulk polymerization, solution polymerization, slurry polymerization, gas phase polymerization and a polymerization process in which the foregoing polymerization processes are optionally combined. A continuous gas phase polymerization is preferred.

In particular, the crystalline ethylene-propylene block copolymer is preferably produced by homopolymerizing propylene in the presence of a stereoregular olefin polymerization catalyst in a first stage where a crystalline propylene homopolymer portion, which is the first segment, is obtained and subsequently copolymerizing ethylene and propylene in a second stage where an ethylene-propylene random copolymer portion, which is the second segment, is obtained.

The content of the polypropylene resin (A) in the thermoplastic resin composition of the present invention is from 35 to 83.9% by weight, preferably from 40 to 80% by weight and more preferably from 45 to 75% by weight.

When the content of the polypropylene resin (A) is less than 35% by weight, the rigidity may decrease, whereas when over 83.9% by weight, the impact strength may decrease.

The elastomer (B) used in the present invention is an elastomer containing a rubber component. Examples thereof include elastomers comprising a vinyl aromatic compound-containing rubber and/or an ethylene-c-olefin random copolymer rubber.

The vinyl aromatic compound-containing rubber used in the present invention is a rubber having in its molecule a moiety derived from a vinyl aromatic compound. Examples thereof include block copolymers made up of a vinyl aromatic compound polymer block and a conjugated diene-based polymer block. Preferred are those in which 80% or more, more preferably 85% or more of double bonds of the conjugated diene portion is hydrogenated. The rubber preferably has a molecular weight distribution (Q value) determined by GPC (gel permeation chromatography) of 2.5 or less, more preferably 2.3 or less. The average content of a vinyl aromatic compound in the vinyl aromatic compound-containing rubber is preferably from 10 to 20% by weight, more preferably from 12 to 19% by weight. Further, the melt flow rate (MFR, measured per JIS K6758 at 230° C.) of the vinyl aromatic compound-containing rubber is preferably from 1 to 15 g/10 min, more preferably from 2 to 13 g/10 min.

Examples of the above-mentioned vinyl aromatic compound-containing rubber include block copolymers such as styrene-ethylene-butene-styrene-based rubber (SEBS), styrene-ethylene-propylene-styrene-based rubber (SEPS), styrene-butadiene-based rubber (SBR), styrene-butadiene-styrene-based rubber (SBS), styrene-isoprene-styrene-based rubber (SIS), and block copolymers obtained by hydrogenation of those rubber components. A rubber obtained by reacting an olefin-based copolymer rubber such as an ethylene-propylene-non-conjugated diene-based rubber (EPDM) with a vinyl aromatic compound such as styrene may also be used suitably. Further, two or more of vinyl aromatic compound-containing rubbers may also be used together.

Examples of the method for the production of the above-mentioned vinyl aromatic compound-containing rubber include a method in which a vinyl aromatic compound is combined, by polymerization, reaction or the like, to an olefin-based copolymer rubber or conjugated diene rubber.

The ethylene-α-olefin random copolymer rubber used in the present invention is a random copolymer rubber made up of ethylene and an α-olefin. The α-olefin is an α-olefin having three or more carbon atoms, such as propylene, butene-1, pentene-1, hexene-1, heptene-1, octene-1 and decene-1. Preferred are propylene, butene-1, hexene-1 and octene-1.

Examples of the ethylene-α-olefin random copolymer rubber include an ethylene-propylene random copolymer rubber, an ethylene-butene-1 random copolymer rubber, an ethylene-hexene-1 random copolymer rubber and an ethylene-octene-1 random copolymer rubber. Preferred are an ethylene-octene-1 random copolymer rubber, an ethylene-butene-1 random copolymer rubber or an ethylene-propylene random copolymer rubber. In addition, two or more kinds of ethylene-α-olefin random copolymer rubbers may be used in combination.

The ethylene-octene-1 random copolymer rubber used in the present invention preferably is that having a Q value (molecular weight distribution) determined by GPC of 2.5 or less, more preferably 2.3 or less. The ethylene-octene-1 random copolymer rubber preferably has an octene-1 unit content of from 15 to 45% by weight, more preferably from 18 to 42% by weight. In addition, the ethylene-octene-1 random copolymer rubber preferably has a melt flow rate (MFR, JIS K6758, 190° C.) of from 1 to 15 g/10 min, more preferably from 2 to 13 g/10 min.

The ethylene-butene-1 random copolymer rubber used in the present invention preferably is that having a Q value (molecular weight distribution) determined by GPC of 2.7 or less, more preferably 2.5 or less. The ethylene-butene-1 random copolymer rubber preferably has a butene-1 unit content of from 15 to 35% by weight, more preferably from 17 to 33% by weight. In addition, the ethylene-butene-1 random copolymer rubber preferably has a melt flow rate (MFR, measured per JIS K6758 at 190° C.) of from 1 to 15 g/10 min, more preferably from 2 to 13 g/10 min.

The ethylene-propylene random copolymer rubber used in the present invention is preferably that having a Q value (molecular weight distribution) determined by GPC of 2.7 or less, more preferably 2.5 or less. The ethylene-propylene random copolymer rubber preferably has a propylene unit content of from 20 to 30% by weight, more preferably from 22 to 28% by weight. In addition, the ethylene-propylene random copolymer rubber preferably has a melt flow rate (MFR, measured per JIS K6758 at 190° C.) of from 1 to 15 g/10 min, more preferably from 2 to 13 g/10 min.

Examples of the method for producing the above-mentioned ethylene-α-olefin random copolymer rubber include a method comprising copolymerizing ethylene and various kinds of α-olefin by a known polymerization method using a known catalyst. Examples of the known catalyst include a catalyst system comprising a vanadium compound and an organoaluminum compound, a Ziegler-Natta catalyst system or a metallocene catalyst system. Examples of the known polymerization method include solution polymerization, slurry polymerization, high pressure ion polymerization or gas phase polymerization method.

The content of the elastomer (B) in the thermoplastic resin composition of the present invention is from 10 to 35% by weight, preferably from 15 to 30% by weight. When the content of the elastomer (B) is less than 10% by weight, the impact strength of the thermoplastic resin composition may decrease. On the other hand, when over 35% by weight, the rigidity and the heat resistance may decrease.

The inorganic filler (c) used in the present invention may be any one which can improve the rigidity. Examples thereof include calcium carbonate, barium sulfate, mica, crystalline calcium silicate, talc and magnesium sulfate fiber. Preferred are talc and/or magnesium sulfate fiber.

Talc used in the present invention is preferably one obtained by grinding hydrous magnesium silicate. The crystal structure of molecules thereof is a pyrophyllite type three-layer structure. Talc comprises a lamination of this structure, and particularly is a tabular powder resulting from fine pulverization of crystals almost to unit layers.

Talc used in the present invention preferably has an average particle size of 3 μm or less. The average particle size of talc means a 50% equivalent particle size $D_{50}$ determined from an integrated distribution curve by a minus sieve method made by suspending talc in a dispersion medium such as water and alcohol using a centrifugal sedimentation type particle size distribution measuring apparatus.

In the present invention, talc may be employed as received without any treatment. Alternatively, it may be employed after the surface treatment using a variety of known silane couplers, titanium couplers, or surfactants such as higher fatty acids, higher fatty acid esters, higher fatty acid amides and higher fatty acid salts in order to improve the interfacial adhesiveness to the polypropylene resin (A) and to improve the dispersibility.

The magnesium sulfate fiber used in the present invention preferably has an average fiber length of from 5 to 50 μm, more preferably from 10 to 30 μm. The magnesium sulfate fiber preferably has an average fiber diameter of from 0.3 to 2.0 μm, more preferably from 0.5 to 1.0 μm.

The content of the inorganic filler in the thermoplastic resin composition of the present invention is from 2 to 30% by weight preferably from 5 to 30% by weight, more preferably from 10 to 30% by weight. When the content of the inorganic filler is less than 2% by weight, the rigidity may decrease, whereas when over 30% by weight, the impact strength may be insufficient, and in addition, the appearance may also deteriorate.

The resin (D) used in the present invention is a resin which satisfies the following (Requirement 1) through (Requirement 3) and which is capable of increasing the swelling ratio of the polypropylene resin composition.

(Requirement 1) The resin has a melt tension (MT), measured at 190° C. at a winding rate of 15.7 m/min, of 0.1 N or more.

(Requirement 2) The resin has a swelling ratio (SR), measured at 220° C. at an L/D ratio of an orifice of 40 and at a shear rate of $1.2 \times 10^3$ $sec^{-1}$, of 1.8 or more.

(Requirement 3) The time required for the resin until the ratio (G(t)/G(0.02)) of a relaxation modulus G(t) measured at 210° C. to a relaxation modulus G(0.02) at a time of 0.02 sec reaches 0.01 is 10 sec or more.

The resin (D) has a melt tension (MT), measured at 190° C. and a winding rate of 15.7 m/min, of 0.1 N or more (Requirement 1), preferably 0.15 N or more (Requirement 1a), and more preferably from 0.15 to 0.4 N. When the melt tension (MT) is less than 0.1, the appearance of molded articles may be unsatisfactory.

With respect to the swelling ratio (SR) of the resin (D) measured at 220° C. at an L/D ratio of an orifice of 40, the swelling ratio at a shear rate (SR) of $1.2 \times 10^3$ $sec^{-1}$ is 1.8 or more (Requirement 2), preferably 2.0 or more (Requirement 2a), and more preferably from 2.0 to 3.0. When the swelling ratio (SR) is less than 1.8, the appearance of molded articles may be unsatisfactory.

The time required for the resin (D) until the ratio (G(t)/G(0.02)) of the relaxation modulus G(t) measured at 210° C. to the relaxation modulus G(0.02) at a time of 0.02 sec measured at 210° C. reaches 0.01 is not less than 10 sec (Requirement 3), preferably not less than 15 seconds, and more preferably not less than 20 sec. The time required is preferably not more than 500 sec. When the time required until the ratio (G(t)/G(0.02)) of the relaxation modulus G(t) measured at 210° C. to the relaxation modulus G(0.02) at a time of 0.02 sec measured at 210° C. reaches 0.01 is not less than 10 seconds, the appearance of molded articles may be unsatisfactory.

A preferable example of resin (D) is a propylene-based polymer composition composed of two components characterized mainly by their intrinsic viscosities, the composition being obtained by a two-stage polymerization carried out in the presence of an olefin polymerization catalyst. The propylene-based polymer composition is composed of a propylene-based polymer component (I) with a relatively high viscosity which is obtained by polymerization of monomers composed mainly of propylene in a first stage and a polypropylene-based polymer component (II) with a relatively low viscosity which is obtained by polymerization of monomers composed mainly of propylene in the second stage subsequent to the first stage. More specifically, a preferable propylene-based polymer composition is one composed of from 40 to 70% by weight of a propylene-based polymer component (I) which has an intrinsic viscosity $[\eta]^A$, measured in TETRALIN® (1,2,3,4-tetrahydronaphthalene) at 135° C., of 5 dl/g or more and a melting peak temperature Tm, measured using a differential scanning calorimeter, of from 130 to 160° C. and from 60 to 30% by weight of a propylene-based polymer component (II) which has an intrinsic viscosity $[\eta]^A$, measured in TETRALIN® (1,2,3,4-tetrahydronaphthalene) at 135° C., of from 0.8 dl/g to 1.3 dl/g and a melting peak temperature Tm, measured using a differential scanning calorimeter, of from 130 to 165° C. The intrinsic viscosity of the propylene-based polymer component (I) measured at the above-mentioned condition is preferably from 5 dl/g to 12 dl/g.

For preparations of the propylene-based polymer components (I) and (II), known polymerization techniques for preparation of propylene-based polymers can be applied. For example, polymerization methods such as bulk polymerization, solution polymerization, slurry polymerization and gas phase polymerization can be employed. The polymerizations can be carried out in either a batch mode or a continuous mode. A combination of the batch and continuous modes can also be employed. A continuous gas phase polymerization is preferred. For the two-stage polymerization, the catalyst system that is disclosed in U.S. Patent Application Publication No. US-2003-0055172-A1, which is incorporated herein by reference, and that comprises a solid catalyst component, an organoaluminum compound and an electron donating component can be used. The amounts of the solid catalyst component, the organoaluminum compound and the electron donating component and the method of introducing these components to polymerization reactors can be determined appropriately with reference to the use conditions of known catalysts. The polymerization temperature is usually from −30° C. to 300° C., preferably from 20° C. to 180° C. The polymerization pressure is usually atmospheric pressure to 10 MPa, preferably from 0.2 MPa to 5 MPa. As a molecular weight regulator, hydrogen can be used, for example. In usual, it is preferable that the polymerization to the propylene-based polymer component (I) with a relatively high viscosity be carried out in the absence of or substantially in the absence of hydrogen, whereas the polymerization to the propylene-based polymer component (II) with a relatively low viscosity be carried out at a hydrogen amount in the gas phase of from about 5 vol % to about 20 vol %.

Examples of the propylene-based polymer component (I) include a propylene homopolymer, an ethylene-propylene random copolymer, and a propylene-α-olefin random copolymer obtained by copolymerizing propylene and an α-olefin having from 4 to 12 carbon atoms (henceforth referred to as an α-olefin (C4-12)). An ethylene-propylene random copolymer is preferred.

Examples of the propylene-based polymer component (II) include a propylene homopolymer, an ethylene-propylene random copolymer, and a propylene-α-olefin(C4-12) random copolymer.

The content of the resin (D) in the thermoplastic resin composition of the present invention is 0.1% by weight or more but less than 5% by weight, preferably from 0.5 to 4.5% by weight, and more preferably from 1.0 to 4.5% by weight. When the content of the resin (D) is less than 0.1% by weight, the appearance of molded articles may be unsatisfactory, while when over 5% by weight, the fluidity may decrease.

The resin (E) used in the present invention is a resin satisfying (Requirement 4) defined below.

(Requirement 4) With respect to the swelling ratio measured at 220° C. at an L/D of an orifice of 40, the ratio of a swelling ratio ($SR10^3$) at a shear rate of $2.4 \times 10^3$ sec$^{-1}$ to a swelling ratio ($SR10^2$) at a shear rate of $1.2 \times 10^2$ sec$^{-1}$, $SR10^3/SR10^2$, is from 1.0 to 1.1.

For the resin (E), with respect to the swelling ratio measured at 220° C. at an L/D of an orifice of 40, the ratio of a swelling ratio ($SR10^3$) at a shear rate of $2.4 \times 10^3$ sec$^{-1}$ to a swelling ratio ($SR10^2$) at a shear rate of $1.2 \times 10^2$ sec$^{-1}$, $SR10^3/SR10^2$ is 1.1 or less (Requirement 4). When the ratio of the swelling ratios, $SR10^3/SR10^2$, is over 1.1, the appearance of molded articles may be unsatisfactory.

Examples of the resin (E) include a polypropylene having a branched structure, examples of which include a polypropylene obtained by irradiating a propylene polymer with a high energy ionizing radiation and a polypropylene obtained by reacting a propylene polymer and a peroxide.

The content of the resin (E) in the thermoplastic resin composition of the present invention is from 4 to 10% by weight, preferably from 5 to 9% by weight. When the content of the resin (E) is less than 4% by weight, the appearance may be unsatisfactory. When over 10% by weight, the fluidity may be insufficient.

The thermoplastic resin composition of the present invention may optionally contain additives such as an antioxidant an ultraviolet absorber, a lubricant, a pigment, an antistatic agent, a copper inhibitor, a flame retardant, a neutralizing agent, a foaming agent, a plasticizer, a nucleating agent, a foam inhibitor and a crosslinking agent in proper amounts in addition to the components (A), (B), (C), (D) and (E).

The thermoplastic resin composition of the present invention can be produced using a kneading machine such as a single-screw extruder, a twin-screw extruder, a Banbury mixer and a heat roll. Addition and mixing of components into the kneading machine can be conducted simultaneously or divisionally. The method for the addition and mixing, may be, but is not restricted to, the following methods.

(Method 1) A method in which a polypropylene resin (A) and an inorganic filler (C) are kneaded, an elastomer (B) is subsequently added to the mixture, and then, a resin (D) and a resin (E) are kneaded.

(Method 2) A method in which an inorganic filler (C) is previously kneaded in high concentration with a polypropylene resin (A) to obtain a master batch, the master batch is diluted with a polypropylene resin (A), an elastomer (B) or the like, and then, a resin (D) and a resin (E) are kneaded.

(Method 3) A method in which a polypropylene resin (A) and elastomer (B) are kneaded, an inorganic filler (C) is added to the mixture, and then, a resin (D) and a resin (E) are kneaded.

(Method 4) A method in which an elastomer (B) is previously kneaded in high concentration with a polypropylene resin (A) to obtain a master batch, a polypropylene resin (A) and an inorganic filler (C) are added to the master batch, and then, a resin (D) and a resin (E) are kneaded.

(Method 5) A method in which a polypropylene resin (A) and an inorganic filler (C), and a polypropylene resin (A) and elastomer (B) are previously kneaded, respectively, thereafter, they are combined, and then, a resin (D) and a resin (E) is kneaded.

The kneading temperature is usually from 170 to 250° C., more preferably from 190 to 230° C. The kneading time is usually from 1 to 20 minutes, more preferably from 3 to 15 minutes.

Further, in these kneading machines, additives such as an antioxidant, an ultraviolet absorber, a lubricant, a pigment, an antistatic agent, a copper inhibitor, a flame retardant, a neutralizing agent, a foaming agent, a plasticizer, a nucleating agent, a foam inhibitor, a crosslinking agent and the like may also be optionally compounded as required in addition to the components (A), (B), (C), (D) and (E).

The thermoplastic resin composition of the present invention can be molded into an injection-molded article by a known injection molding process. Particularly, the injection-molded article is suitably used as parts for automobiles such as a door trim, pillar, instrumental panel, bumper and the like.

EXAMPLES

The present invention is described by way of examples and comparative examples. However, the invention is not restricted to the examples.

The components used in the examples and the comparative examples are shown below.

(1) Polypropylene Resin (A)

COSMOPLENE AZ564G (a crystalline ethylene-propylene block copolymer) manufactured by The Polyolefin Company (2) Elastomer (B)

Engage EG8842 (an ethylene-octene copolymer) manufactured by DuPont Dow Elastomers L.L.C.

(3) Inorganic Filler (C)

Talc, MW HS-T, manufactured by Hayashi Kasei Co.

(4) Resin (D)

The resin (D) had a melt tension (MT), measured at 190° C. and a winding rate of 15.7 m/min, of 0.31 N. With respect to a swelling ratio measured at 220° C. and an L/D of an orifice of 40, the resin had a swelling ratio (SR) at a shear rate of $1.2 \times 10^3$ sec$^{-1}$ of 2.1. The time required until the ratio (G(t)/G(0.02)) of the relaxation elastic modulus G(t) measured at 210° C. to the relaxation elastic modulus G(0.02) at a time of 0.02 sec reaches 0.01 was 226 seconds.

Method for Production of Resin (D)

(4-1) Solid Catalyst Component (I)

Following replacement of the atmosphere in a 200-L SUS reactor equipped with a stirrer by nitrogen, 80 L of hexane, 6.55 mol of tetrabutoxytitanium, 2.8 mol of diisobutyl phthalate and 98.9 mol of tetraethoxysilane were fed to form a homogeneous solution. Then, 51 L of a butylmagnesium chloride solution in diisobutyl ether at a concentration of 2.1 mol/L was dropped slowly over 5 hours while holding the temperature in the reactor at 5° C. After the dropping, the mixture was stirred at 5° C. for one hour and at room temperature for additional one hour. Subsequently, solid-liquid separation was performed at room temperature and washing with 70 L of toluene was repeated three times. Then, the amount of toluene was adjusted so that the slurry concentration became 0.2 Kg/L and the resulting slurry was stirred at 105° C. for one hour. Then, the mixture was cooled to 95° C. and 47.5 mol of diisobutyl phthalate was added, followed by a reaction at 95° C. for 30 minutes. After the reaction, solid-liquid separation was performed and washing with toluene was repeated twice. Then, the amount of toluene was adjusted so that the slurry concentration became 0.4 Kg/L, 3.1 mol of diisobutyl phthalate, 8.9 mol of di-n-butyl ether and 274 mol of titanium tetrachloride were added, followed by a reaction at 105° C. for 3 hours. After the completion of the reaction, solid-liquid separation was performed and washing with 90-L toluene at that temperature was carried out twice. The amount of toluene was adjusted so that the slurry concentration became 0.4 Kg/L, 8.9 mol of di-n-butyl ether and 137 mol of titanium tetrachloride were added, followed by a reaction at 105° C. for one hour. After the completion of the reaction, solid-liquid separation was performed at that temperature and washing with 90-L toluene at the same temperature was carried out three times. After additional three-time washing with 70-L hexane, the residue was dried under reduced pressure, yielding 11.4 Kg of solid catalyst component, which contained 1.83% by weight of titanium atom, 8.4% by weight of phthalate, 0.30% by weight of ethoxy group and 0.20% by weight of butoxy group. This solid catalyst component is hereinafter called solid catalyst component (I).

(4-2) Preliminary Polymerization

In a 3-L SUS autoclave equipped with a stirrer, 25 mmol/L of triethylaluminum (hereafter abbreviated TEA), tert-butyl-n-propyldimethoxysilane (hereafter abbreviated tBnPDMS) as a proton donor component, wherein tBnPDMS/TEA=0.1 (mol/mol), and 15 g/L of solid catalyst component (I) were added to hexane which had been fully dewatered and degassed, Subsequently, a preliminary polymerization was carried out by feeding propylene continuously until the amount of the propylene became 1 g per gram of the solid catalyst while keeping the temperature at 15° C. or lower. The resulting preliminary polymer slurry was transferred to a 120-L SUS dilution vessel with a stirrer, diluted by addition of a fully refined liquid butane, and preserved at a temperature of 10° C. or lower.

(4-3) Main Polymerization

In a 300-L SUS polymerization vessel equipped with a stirrer, liquefied propylene was fed at a rate of 35 kg/h so as to keep a polymerization temperature of 60° C. and a slurry amount of 95 L. Furthermore, ethylene was fed so as to keep an ethylene concentration in a gas phase portion of 2.8 vol %, and a continuous copolymerization of propylene-ethylene was conducted in the substantial absence of hydrogen while feeding TEA at 51 mmol/h, tBunPrDMS at 5 mmol/h and the polymer slurry preliminarily prepared in (4-2) as a solid catalyst component at 1.0 g/h, yielding a polymer at 6.1 Kg/h. The resulting polymer was transferred continuously to a second vessel without being deactivated. In the second vessel, a SUS fluidized bed gas phase reactor having a content volume of 1 m$^3$ equipped with a stirrer, propylene and ethylene were continuously fed so as to keep a polymerization temperature of 70° C., a polymerization pressure of 1.8 MPa and an ethylene concentration in a gas phase portion of 1.9 vol %, and a continuous gas phase polymerization was continued using the solid catalyst component-containing polymer transferred from the first vessel in the substantial absence of hydrogen, yielding a polymer at 15.7 Kg/h. The polymer component produced in the first and second vessels corresponds to a propylene-based polymer component (I), and has an intrinsic viscosity [η] of 8.7 dl/g, an ethylene content of 3.5% by weight, and a melting temperature peak of 144.8° C. Subsequently, the resulting polymer was transferred continuously to a third vessel without being deactivated. In the third vessel, SUS gas phase fluidized bed reaction vessel having a content volume of 1 m$^3$ equipped with a stirrer, propylene and hydrogen were continuously fed as to keep a polymerization temperature of 85° C., a polymerization pressure of 1.4 MPa and a hydrogen concentration in a gas phase portion of 11.7 volt, and continuous gas phase polymerization was continued using the polymer containing a solid catalyst component fed from the second vessel, yielding a polymer at 25.6 Kg/h. The polymer component produced in the third vessel corresponds to a propylene-based polymer component (II). The polymer obtained through from the first vessel to the third vessel is a propylene-based polymer composition composed of the propylene-based polymer component (I) and the propylene-based polymer component (II), the intrinsic viscosity [η]of which composition was 5.7 dl/g. From the above-mentioned results, it was determined that the ratio of the total polymerization amount of the first and second vessels to the polymerization amount of the third vessel was 61:39, and the polymer produced in the third vessel had an intrinsic viscosity [η]of 0.9 dl/g.

(5) Resin (E)

PF 814 (SR10$^3$/SR10$^2$=1.05) manufactured by Montell (6) H501N

Sumitomo Norblen manufactured by Sumitomo Chemical Co., Ltd.

Methods for measuring physical properties of the resin components and the compositions used in examples and comparative examples are shown below.

(1) Melt Flow Rate (MFR, Unit: g/10 Min)

Melt flow rate was measured according to a method defined in JIS K6758. Unless other wise stated, it was measured at a measurement temperature of 230° C. and a load of 2.16 kg.

(2) Flexural Modulus (FM, Unit: MPa)

Flexural modulus was measured according to a method defined in JIS K7203. It was measured under a load rate of 2.0 or 30 mm/min at a measurement temperature of 23° C. using a specimen having a thickness of 6.4 mm and a span length of 100 mm prepared by injection molding.

(3) Izod Impact Strength (Izod, Unit: KJ/m$^2$)

Izod impact strength was measured according to a method defined in JIS K7110. It was measured at a measurement temperatures of 23° C. and −30° C. using a notched specimen having a thickness of 6.4 mm prepared by injection molding followed by notching.

(4) Heat Distortion Temperature (HDT, Unit: ° C.)

Heat distortion temperature was measured according to a method defined in JIS K7207. It was measured at a fiber stress of 1.82 MPa.

(5) Rockwell Hardness (HR)

Rockwell hardness was measured according to a method defined in JIS K7202. It was measured using a specimen having a thickness of 3.0 mm prepared by injection molding. The measurements are shown in R scale.

(6) Brittle Temperature (BP, Unit: ° C.)

Brittle temperature was measured according to a method defined in JIS K7216. A given specimen of 6.3×38×2 mm was punched out from a flat plate of 25×150×2 mm molded by injection molding, and the measurement was conducted using this specimen.

(7) Intrinsic Viscosity (Unit: dl/g)

Reduced viscosities were measured at three points of concentrations of 0.1, 0.2 and 0.5 g/dl using a Ubellohdo type viscometer. Intrinsic viscosity was calculated by a calculation method described on page 491 in "Kobunshi Yoeki (Polymer Solution), Kobunshi Jikkengaku (Polymer Experiment Study) 11" (published by Kyoritsu Shuppan K. K., 1982), namely, by an extrapolation method in which reduced viscosities are plotted against concentrations and the concentration is extrapolated in zero.

Regarding a crystalline polypropylene, the intrinsic viscosity was measured at a temperature of 135° C. using TETRALIN® (1,2,3,4-tetrahydronaphthalene) as a solvent.

(7-1) Intrinsic Viscosity of Crystalline Ethylene-Propylene Block Copolymer (7-1a) Intrinsic Viscosity of Propylene Homopolymer Portion (First Segment): $[\eta]_P$ The intrinsic viscosity: $[\eta]_P$ of a propylene homopolymer portion which is a first segment of a crystalline ethylene-propylene block copolymer was measured as follows. A propylene homopolymer was sampled from a polymerization reactor during its production after polymerization of the propylene homopolymer portion as the first step. The propylene homopolymer sampled was measured for intrinsic viscosity $[\eta]_P$.

(7-1b) Intrinsic Viscosity of Ethylene-Propylene Random Copolymer Portion (Second Segment): $[\eta]_{EP}$ The intrinsic viscosity $[\eta]_{EP}$ of an ethylene-propylene random copolymer portion which is a second segment of a crystalline ethylene-propylene block copolymer was determined by measuring the intrinsic viscosity, $[\eta]_P$, of a propylene homopolymer portion and the intrinsic viscosity, $[\eta]_T$, of the total ethylene-propylene block copolymer, respectively, and effecting calculation according to the following equation using weight ratio, X, of the ethylene-propylene random copolymer portion to the total crystalline ethylene-propylene block copolymer.

$$[\eta]_{EP}=[\eta]_T/X-(1/X-1)[\eta]_P$$

$[\eta]_P$: Intrinsic viscosity of propylene homopolymer portion (dl/g)

$[\eta]_T$: Intrinsic viscosity of total block copolymer (dl/g)

(7-1c) Weight Ratio of Ethylene-Propylene Random Copolymer Portion to Total Crystalline Ethylene-Propylene Block Copolymer: X The weight ratio, X, of an ethylene-propylene random copolymer portion to the total crystalline ethylene-propylene block copolymer was obtained by measuring the crystal fusion heats of a propylene homopolymer portion (first segment) and the total crystalline ethylene-propylene block copolymer, respectively, and effecting calculation using the following equation. The crystal fusion heat was measured by differential scanning calorimetry (DSC).

$$X=1-(\Delta H_f)_T/(\Delta H_f)_P$$

$(\Delta H_f)_T$: Fusion heat of total block copolymer (cal/g)

$(\Delta H_f)_P$: Fusion heat of propylene homopolymer portion (cal/g)

(8) Ethylene Content of Ethylene-Propylene Random Copolymer Portion in Crystalline Ethylene-Propylene Block Copolymer: $(C_2')_{EP}$ The ethylene content, $(C_2')_{EP}$, of an ethylene-propylene random copolymer portion in a crystalline ethylene-propylene block copolymer was determined by measuring the ethylene content $(C_2')_T$ (wt %) of the total crystalline ethylene-propylene block copolymer by infrared absorption spectrometry, and effecting calculation using the following equation.

$$(C_2')_{EP}=(C_2')_T/X$$

$(C_2')_T$: Ethylene content (wt %) of total block copolymer $(C_2')_{EP}$: Ethylene content (wt %) of ethylene-propylene random copolymer portion X: Weight ratio of ethylene-propylene random copolymer portion to total crystalline ethylene-propylene block copolymer (9) Isotactic Pentad Fraction The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by a method disclosed in A. Zambelli et al., Macromolecules, 6, 925 (1973), namely, by $^{13}$C-NMR. However, the assignment of NMR absorption peaks was conducted based on Macromolecules, 8, 687 (1975) published thereafter.

Specifically, the isotactic pentad fraction was measured as an area fraction of mmmm peaks in all absorption peaks in the methyl carbon region of a $^{13}$C-NMR spectrum. According to this method, the isotactic pentad fraction of an NPL standard substance. CRM No. M19-14 Polypropylene PP/MWD/2 available from NATIONAL PHYSICAL LABORATORY, G.B. was measured to be 0.944.

(10) Molecular Weight Distribution (Q Value)

Gel permeation chromatograph (GPC) was measured under the following conditions.

GPC: Model 150C, manufactured by Waters

Column: Shodex 80 MA, two columns, manufactured by Showa Denko K.K.

Amount of sample; 300 ml (polymer concentration: 0.2 wt %)

Flow rate: 1 ml/min

Temperature: 135° C.

Solvent: o-Dichlorobenzene

A calibration curve of eluted volume vs. molecular weight was prepared using a standard polystyrene manufactured by Tosoh Corporation. The weight average molecular weight based on a polystyrene calibration standard and the number average molecular weight were calculated using the calibration curve, and the Q value, which is a scale of molecular weight distribution, was calculated as a ratio of the weight average molecular weight (Mw) to the number average molecular weight (Mn), namely Mw/Mn.

(11) Melt Tension (MT, Unit: N)

The melt tension was measured according to the following conditions using a melt tension tester RE2 manufactured by Toyo Seiki Seisaku-Sho, Ltd.

Measurement temperature: 190° C.

Winding rate: 15.7 mm/min

(12) Swelling Ratio (SR)

The swelling ratio was measured according to the following conditions using a Capillograph 1B manufactured by Toyo Seiki Seisaku-Sho, Ltd.

Measurement temperature: 220° C.

L/D: 40

Shear rate: $1.2 \times 10^3$ sec$^{-1}$

(13) Time Required Until Ratio of Relaxation Elastic Modulus G(t) to Relaxation Elastic Modulus G(0.02) in Time of 0.02 sec Reaches 0.01

The time required until the ratio of relaxation elastic modulus G(t) to relaxation elastic modulus G(0.2) in a time of 0.02 sec reaches 0.01 was measured according to the following conditions using a mechanical spectrometer RMS-800 manufactured by Rheometries Co., Ltd.

Measurement mode: Stress Relaxation

Measurement temperature: 210° C.

Plate form: 25 mmϕ Parallel plate

Distance between plates: 1.9 mm

Amount of strain: 0.2

Applied strain: 0.2

(14) Appearance

The appearance of a specimen prepared by injection molding was observed visually and was judged to be good or poor.

(Production of Injection Molded Article)

Specimens which are injection-molded articles for evaluation of physical properties in the above-mentioned (2), (3), (4), (5), (6) and (14) were manufactured by the following method.

A composition was dried in a hot air drier at 120° C. for 2 hours, and then injection-molded with an injection molding machine, model IS150E-V, manufactured by Toshiba Machine Co., Ltd. at a molding temperature of 220° C., a mold cooling temperature of 50° C., an injection time of 15 sec and a cooling time of 30 sec, resulting in a specimen.

(Production of Thermoplastic Resin Composition)

A thermoplastic resin composition was produced by the following method.

Predetermined amounts of components were weighed, preliminarily mixed homogenously in a Henschel mixer or tumbler mixer, then, kneaded and extruded using a twin-screw kneading extruder (TEX44SS 30BW-2V type, manufactured by The Japan Steel Works, Ltd.) at an extrusion rate of from 30 to 50 kg/hr and a screw revolution of 350 rpm under vent suction, resulting in a composition. The screw was constituted by arranging a triple thread type rotor and a kneading disc at two position in a kneading zone, namely, a first feed inlet and a second feed inlet.

The contents (% by weight) of the individual components in the thermoplastic resin compositions of Examples 1 and 2 are shown in Table 1. The contents of the individual components in the thermoplastic resin compositions of Comparative Examples 1 to 5 are shown in Tables 2.

The physical properties of the thermoplastic resin compositions of Examples 1 and 2 and the physical properties and appearances of the injection-molded articles obtained by use of the compositions are shown in Table 3. The physical properties of the thermoplastic resin compositions of Comparative Examples 1 to 5 and the physical properties and appearances of the injection-molded articles obtained by use of the compositions are shown in Table 4.

TABLE 1

|  |  | Example 1 | Example 2 |
|---|---|---|---|
| Composition (% by weight) | AZ564G | 61 | 56 |
|  | EG8200 | 18 | 18 |
|  | Talc | 12 | 12 |
|  | Resin D | 4 | 4 |
|  | Resin E | 5 | 10 |

TABLE 2

|  |  | Comparative Example | | | | |
|---|---|---|---|---|---|---|
|  |  | 1 | 2 | 3 | 4 | 5 |
| Composition (% by weight) | AZ564G | 66 | 65 | 63 | 51 | 61 |
|  | EG8200 | 18 | 18 | 18 | 18 | 18 |
|  | Talc | 12 | 12 | 12 | 12 | 12 |
|  | Resin D | 4 | 4 | 4 | 4 | 4 |
|  | Resin E | 0 | 1 | 3 | 15 | 0 |
|  | H501N | 0 | 0 | 0 | 0 | 5 |

TABLE 3

|  | Example 1 | Example 2 |
| --- | --- | --- |
| MFR (g/10 min) | 16.5 | 15.8 |
| FM (MPa) | 1295 | 1294 |
| Izod at 23° C. (KJ/m$^2$) | 59.4 | 62.0 |
| at −30° C. (KJ/m$^2$) | 4.5 | 4.6 |
| HDT (at 1.82 MPa stress) (° C.) | 57.3 | 58.8 |
| HR (R scale) | 45.7 | 48.6 |
| BP (° C.) | −28.0 | −28.8 |
| Appearance | Good | Good |

TABLE 4

|  | Comparative Example | | | | |
| --- | --- | --- | --- | --- | --- |
|  | 1 | 2 | 3 | 4 | 5 |
| MFR (g/10 min) | 19.3 | 18.6 | 19.8 | 12.9 | 18.2 |
| FM (MPa) | 1240 | 1285 | 1294 | 1304 | 1307 |
| Izod at 23° C. (KJ/m$^2$) | 65.9 | 66.1 | 65.1 | 58.3 | 63.5 |
| at −30° C. (KJ/m$^2$) | 5.0 | 4.8 | 4.7 | 4.3 | 4.7 |
| HDT (1.82 MPa stress) (° C.) | 56.3 | 59.1 | 58.7 | 58.4 | 57.1 |
| HR (R scale) | 42.3 | 44.8 | 46.4 | 49.4 | 48.9 |
| BP (° C.) | −28.5 | −28.5 | −27.2 | −28.5 | −23.0 |
| Appearance | Poor | Poor | Poor | Good | Poor |

Examples 1 and 2 are directed to thermoplastic resin compositions satisfying the requirements of the present invention. It is clear that the thermoplastic resin compositions are excellent in balance between rigidity (flexural modulus (FM), heat distortion temperature (HDT) and Rockwell hardness (HR)) and impact strength (Izod impact strength (Izod) and brittle temperature (BP)), and that the injection-molded articles have good appearances.

On the contrary, Comparative Example 1 is directed to a thermoplastic resin composition using no resin (E), which is one of the requirements of the present invention. It is clear that the appearance of an injection-molded article is poor.

Comparative Examples 2 and 3 are directed to thermoplastic resin compositions which do not satisfy the content of resin (E) which is one of the requirements of the present invention. It is clear that the appearance of the injection-molded articles is poor.

Comparative Example 4 is directed to a thermoplastic resin composition which do not satisfy the content of resin (E) which is one of the requirements of the present invention. It is clear that the fluidity is insufficient.

Comparative Example 5 is directed to a thermoplastic resin composition using H501N in place of resin (E) which is one of the requirements of the present invention. It is clear that the appearance of the injection-molded articles is poor.

As described in detail above, a thermoplastic resin composition which is excellent in rigidity, impact strength and fluidity and molded articles having excellent appearance, especially having favorable flow marks, can be obtained therefrom. In addition, an injection-molded article comprising the thermoplastic resin composition can be obtained according to the present invention.

What is claimed is:

1. A thermoplastic resin composition comprising (A) 35 to 83.9% by weight of a polypropylene resin, (B) 10 to 35% by weight of an elastomer, (C) 2 to 30% by weight of inorganic filler, (D) 0.1% by weight or more but less than 5% by weight of a resin satisfying (Requirement 1) through (Requirement 3) defined below, and (E) 4 to 10% by weight of a resin satisfying (Requirement 4) defined below, provided that the amounts of (A), (B), (C), (D) and (E) indicated above are based on the total weight of these components:

(Requirement 1) the resin has a melt tension (MT), measured at 190° C. at a winding rate of 15.7 m/min, of 0.1 N or more;

(Requirement 2) the resin has a swelling ratio (SR), measured at 220° C. at an L/D ratio of an orifice of 40 and at a shear rate of $1.2 \times 10^3$ sec$^{-1}$, of 1.8 or more;

(Requirement 3) the time required for the resin until the ratio (G(t)/G(0.02)) of a relaxation modulus G(t) measured at 210° C. to a relaxation modulus G(0.02) at a time of 0.02 sec reaches 0.01 is 10 sec or more; and (Requirement 4) with respect to the swelling ratio measured at 220° C. at an L/D of an orifice of 40, the ratio of a swelling ratio (SR10$^3$) at a shear rate of $2.4 \times 10^3$ sec$^{-1}$ to a swelling ratio (SR10$^2$) at a shear rate of $1.2 \times 10^2$ sec$^{-1}$, SR10$^3$/SR10$^2$, is from 1.0 to 1.1.

2. The thermoplastic resin composition according to claim 1, wherein the content of the polypropylene resin (A) is from 40 to 80% by weight.

3. The thermoplastic resin composition according to claim 1, wherein the elastomer (B) comprises a vinyl aromatic compound-containing rubber and/or an ethylene-a-olefin copolymer and wherein the content of the elastomer (B) is from 15 to 30% by weight.

4. The thermoplastic resin composition according to claim 1, wherein the inorganic filler (C) is talc and/or magnesium sulfate fiber and wherein the content of the filler (C) is from 5 to 30% by weight.

5. The thermoplastic resin composition according to claim 1, wherein the resin (D) is a resin satisfying (Requirement 1a), (Requirement 2a) and (Requirement 3a) defined below and wherein the content of the resin (D) is from 0.5 to 4.5% by weight:

(Requirement 1a) the resin has a melt tension (MT), measured at 190° C. at a winding rate of 15.7 m/min, of 0.15 N or more;

(Requirement 2a) the resin has a swelling ratio (SR), measured at 220° C. at an L/D ratio of an orifice of 40 and at a shear rate of $1.2 \times 10^3$ sec$^{-1}$, of 2.0 or more; and (Requirement 3a) the time required for the resin until the ratio (G(t)/G(0.02)) of a relaxation modulus G(t) measured at 210° C. to a relaxation modulus G(0.02) at a time of 0.02 sec reaches 0.01 is 15 sec or more.

6. The thermoplastic resin composition according to claim 1, wherein resin (D) is a propylene-based polymer composition comprising from 40 to 70% by weight of a propylene-based polymer component (I) which has an intrinsic viscosity [η]$^A$, measured in 1,2,3,4-tetrahydronaphthalene 135° C., of 5 dl/g or more and a melting peak temperature Tm, measured using a differential scanning calorimeter, of from 130 to 160° C., and from 60 to 30% by weight of a propylene-based polymer component (II), which is different than the propylene-based polymer component (I).

7. The thermoplastic resin composition according to claim 1, wherein the resin (E) is a polypropylene having a branched structure.

8. An injection-molded article comprising the thermoplastic resin composition according to any one of claims 1 to 7.

* * * * *